United States Patent [19]
Biekx

[11] Patent Number: 6,139,027
[45] Date of Patent: Oct. 31, 2000

[54] CV JOINT BOOT WITH SEALING SLEEVES

[76] Inventor: Ron O. Biekx, 37 Barnes Street, St. Thomas, Ontario, Canada, N5R 2O5

[21] Appl. No.: 09/002,680

[22] Filed: Jan. 5, 1998

[51] Int. Cl.[7] ....................................................... F16J 15/54
[52] U.S. Cl. .......................... 277/634; 277/636; 277/631; 464/175
[58] Field of Search ..................................... 277/635, 636, 277/630, 631, 634; 464/175

[56] References Cited

U.S. PATENT DOCUMENTS

| | | |
|---|---|---|
| 2,025,635 | 12/1935 | Bishoff . |
| 2,102,797 | 12/1937 | Helmer ................................. 277/636 X |
| 2,378,046 | 8/1945 | Stergis . |
| 4,210,002 | 7/1980 | Dore ......................................... 277/636 |
| 4,224,808 | 9/1980 | Gehrke . |
| 4,378,858 | 4/1983 | Goft et al. ................................ 464/175 |
| 4,558,869 | 12/1985 | Grove et al. ......................... 464/175 X |
| 4,639,159 | 1/1987 | Amrath ................................... 277/636 |
| 4,676,513 | 6/1987 | Tiegs et al. . |
| 4,685,686 | 8/1987 | Weiler ..................................... 277/636 |
| 4,813,913 | 3/1989 | Belter . |
| 4,819,919 | 4/1989 | Taylor ................................. 277/636 X |
| 5,078,652 | 1/1992 | Baker ................................. 277/636 X |
| 5,149,109 | 9/1992 | Jelinek et al. ....................... 277/631 X |
| 5,182,956 | 2/1993 | Woodall et al. ..................... 277/636 X |
| 5,222,746 | 6/1993 | Van Steenbrugge . |
| 5,419,741 | 5/1995 | Schwarzler ......................... 277/636 X |
| 5,431,601 | 7/1995 | Nakumura ........................... 277/636 X |
| 5,801,737 | 9/1998 | Sato et al. ................................ 347/86 |
| 5,845,911 | 12/1998 | Gimino .................................... 277/636 |

FOREIGN PATENT DOCUMENTS

| | | |
|---|---|---|
| 550651 | 9/1956 | France . |
| 1155819 | 5/1985 | U.S.S.R. . |
| 2230570 | 10/1990 | United Kingdom . |

*Primary Examiner*—Anthony Knight
*Assistant Examiner*—Mark Williams
*Attorney, Agent, or Firm*—Richard C. Litman

[57] ABSTRACT

A protective constant velocity (CV) joint boot having a tubular body with end openings and one longitudinal seam running from one end opening to the other enables rapid replacement of existing monolithic CV joint boots. Additionally, reinforcement of the tubular body of the protective boot against stresses caused by movement of the joint is accomplished through the use of a pair of sealing sleeves, also having seams, which are fitted under the tubular body of the protective boot. The edges of the seam of the tubular boot interlock with, as seen in cross section, an arrow head shaped male member on one edge of the seam which locks past a pair of nubs on a female retaining edge of the seam. The seams of the sleeves are off-set with the seam of the tubular body of the protective boot, thus accomplishing a more effective seal. Both sleeves have a flange that lends strength to the crests nearest the ends of the protective boot, which under most driving conditions receive more stress than the central portion. The protective boot does not require removal or replacement of any suspension or brake components during the replacement of a damaged or worn boot.

2 Claims, 5 Drawing Sheets

CV JOINT BOOT WITH SEALING SLEEVES

BACKGROUND OF THE INVENTION

1. Field of the Invention

The present invention relates generally to a protective boot for enclosing a flexible rotating joint, and more specifically to a constant velocity (CV) joint boot with sealing sleeves having seams for rapidly installing the boot and sleeves.

2. Description of the Related Art

Protective boots for CV joints and similar axle joints have been proposed and are well known in the art as evidenced by the U.S. Patents to Charles C. Bishoff, U.S. Pat. No. 2,025,635; Stergis M. Stergis, U.S. Pat. No. 2,378,046; Glenn F. Gehrke, U.S. Pat. No. 4,224,808; Clinton E. Grove et al., U.S. Pat. No. 4,558,869; Del V. Tiegs, U.S. Pat. No. 4,676,513; Jerome G. Belter, U.S. Pat. No. 4,813,913; and Marcel Van Steenbrugge, U.S. Pat. No. 5,222,746. In addition, a number of foreign patents disclose protective boots as evidenced by French Patent No. 550,651 to A. Tasset; Russian Patent No. 1,155,819 to V. A. Popovtsev; and British Patent No. 2,230,570 to Michael C, Shepherd.

Protective boots for enclosing CV joints and other similar flexible rotating joints have a generally tubular shape with end openings and a bulbous or bellows like mid-portion having crests and troughs. Original equipment protective boots which are constructed as a one-part body pose no particular difficulty during initial installation, as the assembly of the CV joint is carried out simultaneously. However, when the original equipment boot becomes defective because of the presence of a cut, a tear, a crack, or a porosity leak, the boot may lose lubricant, or allow water or dirt to enter the boot, causing eventual deterioration of the joint. Replacement of the original equipment boot with another one-part boot necessitates, at least, partial disassembly of the joint because of a need to thread the axle shaft through the boot. The result is high labor cost associated with the disassembly of the joint for an otherwise relatively simple task. It is therefore desirable to provide a protective boot which can be installed quickly and easily, without disassembly of the joint. Such easily installed protective boots have at least one seam running from one end opening to the other.

The French patent to Tasset discloses a protective boot with a seam which can be slipped over the joint without any disassembly thereof. The longitudinal seam which traverses the length of the protective boot from one opening to the other has a tongue on one side of the seam and a corresponding groove on the other side. A number of holes pass through the tongue and a number of holes, aligned with the previous holes, pass through the groove. A plurality of rivets, driven through the holes, fasten the sides of the seal together.

The patent to Stergis shows a protective boot which uses a cord, threaded through holes on either side of a seam within the boot, to fasten the seam together. The patents to Belter and Bishoff each use a zipper to fasten together the sides of a seam within a protective boot. A protective boot with a seam having a tongue on one side of the seam and a groove on the other, which is fastened together by an adhesive, is disclosed by the patent to Van Steenbrugge. The patent to Shepherd also employs an adhesive to fasten together the flat faces of the opposing sides of a seal within a protective boot.

The patent to Grove et al. discloses the use of adapter rings placed within the end openings of a protective boot thereby permitting a single boot size to be fitted to several different axle and housing sizes and shapes. The patent to Gehrke discloses a venting arrangement for a stroking universal joint which utilizes a vent sleeve with a seam that is seated upon the drive shaft and maintained in position by the clamped neck portion of a flexible elastomeric protective boot.

Alternatively, the protective boot may be spiral as shown by the patent to Popovtsev. A spiral protective boot having a spiral seal within the boot and an interlocking sealing means to fasten the seal together is shown in the patent to Tiegs et al.

However, none of the prior art protective boots, which have a seam for rapid installation around CV joints and similar axle devices, include a sleeve with a seam having a flange which improves the overall strength and the integrity of the seam therein. Nor do any of the prior art devices include a sealing means having, as seen in cross section, an arrow shaped male mating edge and a complimentary female mating groove. None of the above inventions and patents, taken either singularly or in combination, is seen to describe the instant invention as claimed. Thus a CV joint protective boot solving the aforementioned problems is desired.

SUMMARY OF THE INVENTION

A constant velocity (CV) joint protective boot having a tubular body with end openings and one longitudinal seam running from one end opening to the other enables rapid replacement of existing monolithic CV joint boots. Additionally, reinforcement of the protective boot against stresses caused by movement of the joint is accomplished through the use of a pair of sealing sleeves, also having seams, which are fitted under the protective boot. The edges of the seam of the tubular body of the protective boot are interlocking. As seen in cross section, an arrowhead-shaped male member on one edge of the seam locks past a pair of nubs on a female retaining edge of the seam. The seams of the sleeves are off-set with the seam of the tubular body of the protective boot, thus accomplishing a more effective seal. Both sleeves have a flange. The flange lends strength to the crests nearest the end of the protective boot under which the sleeve is positioned. Under most driving conditions the ends of the protective boot receive more stress than the central portion thereof. The protective boot of the present invention does not require removal or replacement of any suspension or brake components during the replacement of a damaged or worn boot.

Accordingly, it is a principal object of the invention to provide a protective boot for a CV joint wherein reinforcement of the protective boot against stresses caused by movement of the joint is accomplished through the use of a pair of sealing sleeves, also having seams, which are fitted under the protective boot.

It is another object of the invention to provide a protective boot wherein the edges of the seam of the tubular body of the protective boot are interlocking.

It is a further object of the invention to provide a means for interlocking the seams of a protective boot which, as seen in cross-section, have an arrowhead-shaped male member on one edge of the seam, locking past a pair of nubs on the female retaining edge of the seam.

Still another object of the invention is to provide a flange on one end of each sealing sleeve which lends strength to the crests nearest the end of the protective boot under which the sleeve is positioned.

It is an object of the invention to provide improved elements and arrangements thereof in a CV joint boot for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
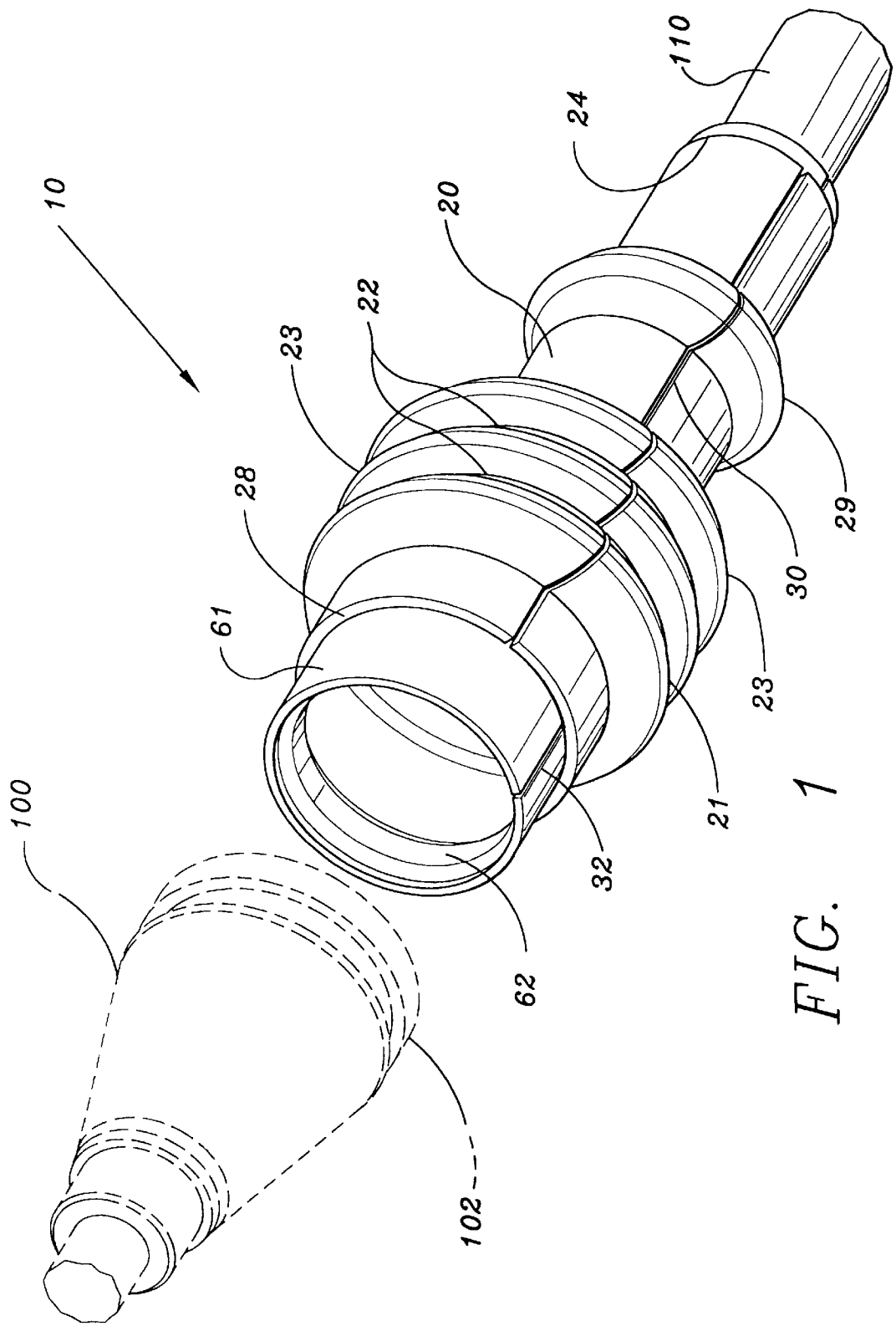
FIG. 1 is an environmental perspective view of the CV joint boot with secondary sleeves according to the present invention having a portion of the boot and sleeve cut away to expose the relationship between the seams thereof.

Referring to the figures by numerals of reference, and first to FIG. 1, a protective boot for enclosing a flexible rotating joint generally designated by the reference numeral 10 will be described. The protective boot 10 has a thin walled, substantially tubular body 20 of flexible resilient material. A plurality of alternating crests 23 and troughs 22, including a first crest 21 and a last crest 29, allow the length of the tubular body 20 to vary depending on the orientation of the flexible rotating joint. The tubular body 20 of the protective boot 10 has a large end opening 28 and small end opening 24. A longitudinal seam 30 in the thin wall runs from the large end opening 28 to the small end opening 24. A liner connector 50 joins together the longitudinal seam 30 of the thin walled tubular body.

Figure 5:
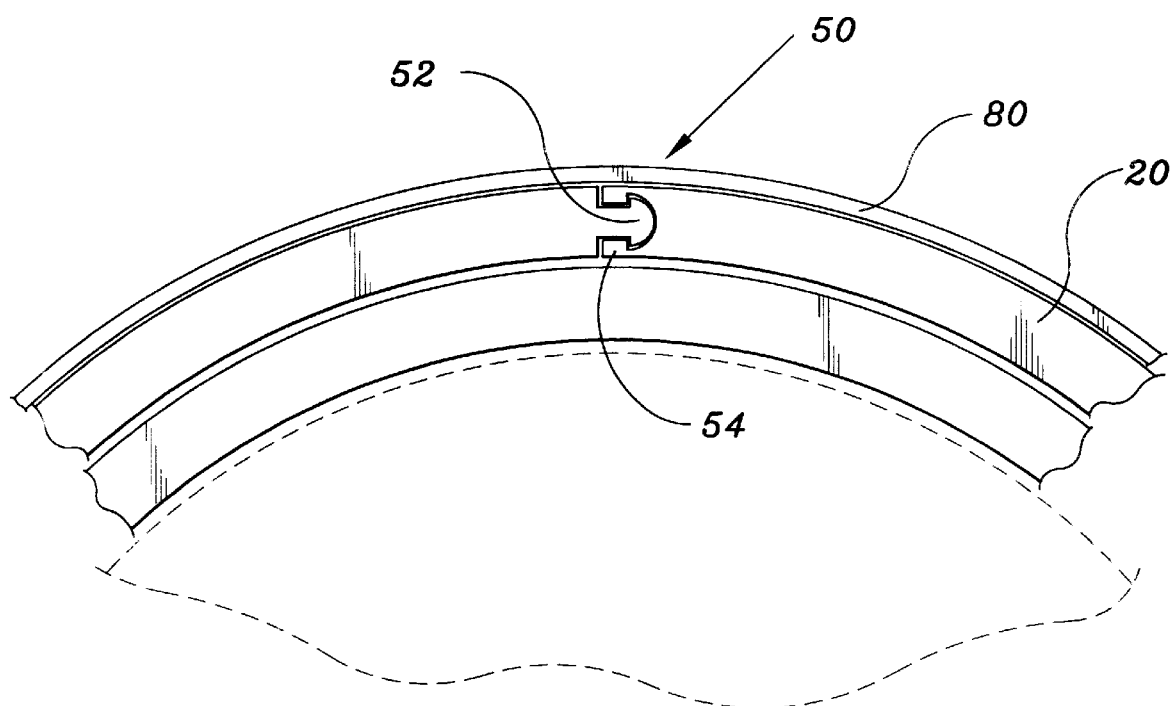
FIG. 5 is an enlarged scale detail view showing the mechanical interlocking seam according to the present invention.

Referring to FIG. 5, the liner connector 50 includes an elongate male connective member 52 having an arrow shaped profile, as seen in cross section, connected to one side of a seam and an elongate female connective member 54 having a C-shaped profile, as seen in cross section, connected to the other side of a seam. The male connective member 52 is lubricated by a silicon adhesive immediately prior to being inserted into the female connective member 54. The male connective member 52 and the female connective member 54 mutually interlock upon insertion of the male member 52 and the male connective member 52 becomes bonded to the female connective member 54 upon drying of the silicon adhesive thereby effecting a permanent seal of the seam.

Figure 4:
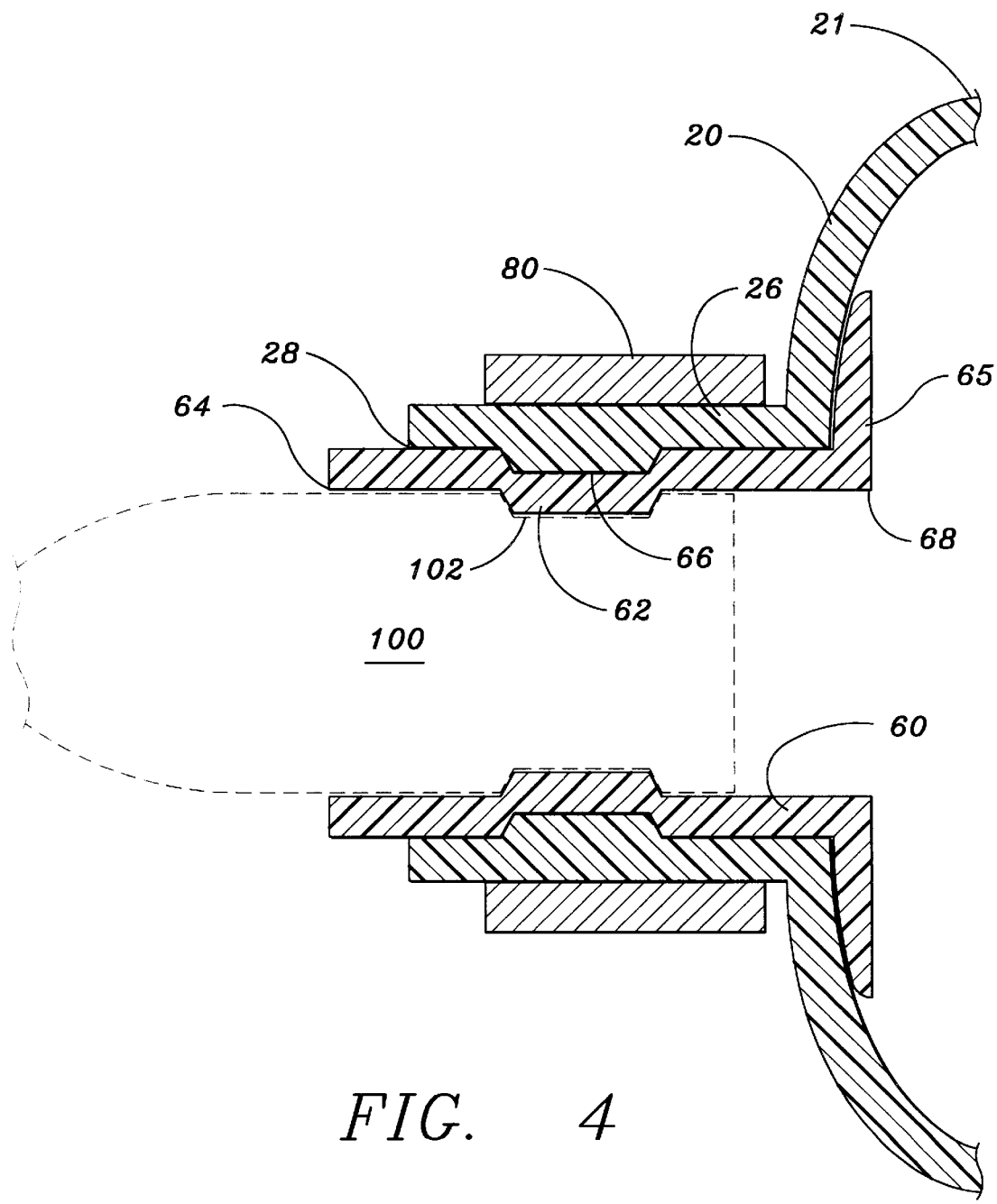
FIG. 4 is an enlarged scale, longitudinal, cross-sectional view of the small open end of the CV joint boot and the small secondary sleeve upon the axle portion of a CV joint.

Referring to FIG. 4, a large sealing sleeve 60, that has a primary end opening 68 and ancillary end opening 64, is seated on the housing 100 of a flexible rotating joint and maintained in position underneath the clamped large end opening 28 of the tubular body 20. The large sleeve 60 has a ridge 62 projecting from its interior which corresponds to a groove 102 in the housing of a flexible rotating joint. The large sleeve 60 also has a groove 66 on its exterior into which a ridge 26 on the interior of the large end opening 28 of the tubular body 20 is seated. A large flange 65 extends outward from the large sealing sleeve 60, proximate the primary end opening 68.

Figure 3:
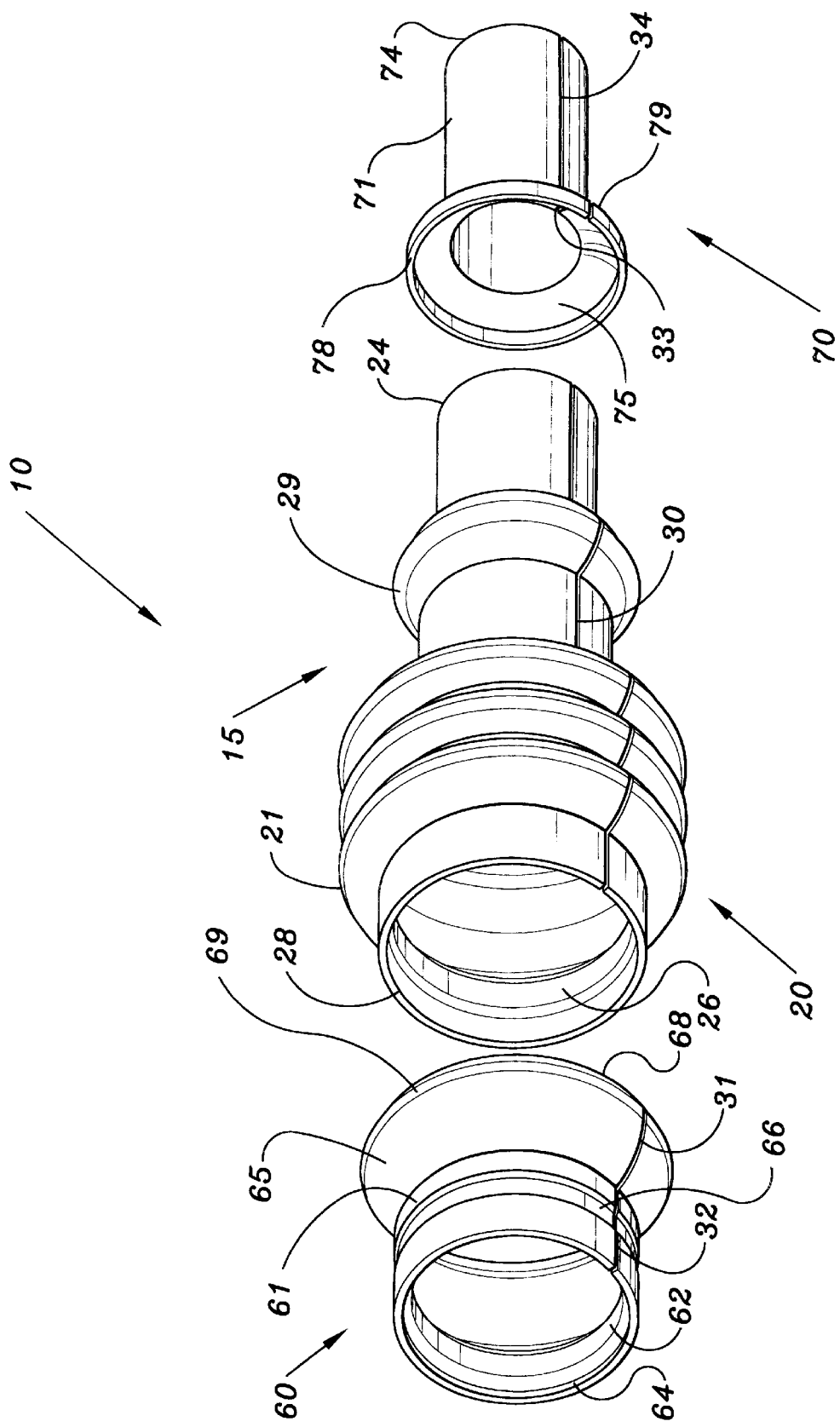
FIG. 3 is an exploded view of the CV joint boot and secondary sleeves.

Referring to FIGS. 1 and 3, the large flange 65 has a radial seam 31 running from the exterior 61 of the large sleeve 60 to the outer diameter of the large flange 69. A longitudinal seam 32 running from the ancillary end opening 64 to the primary end opening 68 meets with the radial seam 31 of the large flange 65. The large flange 65 lends strength to the first crest 21, which under most driving conditions receives more stress than the central portion 15 of a protective boot. The seam of the sleeve 32 and the seam of the tubular body 20 are offset, such that failure of one of the seams to remain sealed in the area in which the sleeve and tubular body overlap is overcome by the remaining sealed seam. The groove 102 on housing 100 of a flexible rotating joint prevents the large sleeve 60, which has a corresponding ridge 62 projecting from its interior, from slipping from the housing 100. A similar groove 66 around the exterior of the large sleeve 60 prevents the clamped tubular body 20 of the protective boot 10, which has a corresponding ridge 26 projecting from the interior of the large end opening 28 thereof, from slipping from the large sleeve 60.

Figure 2:
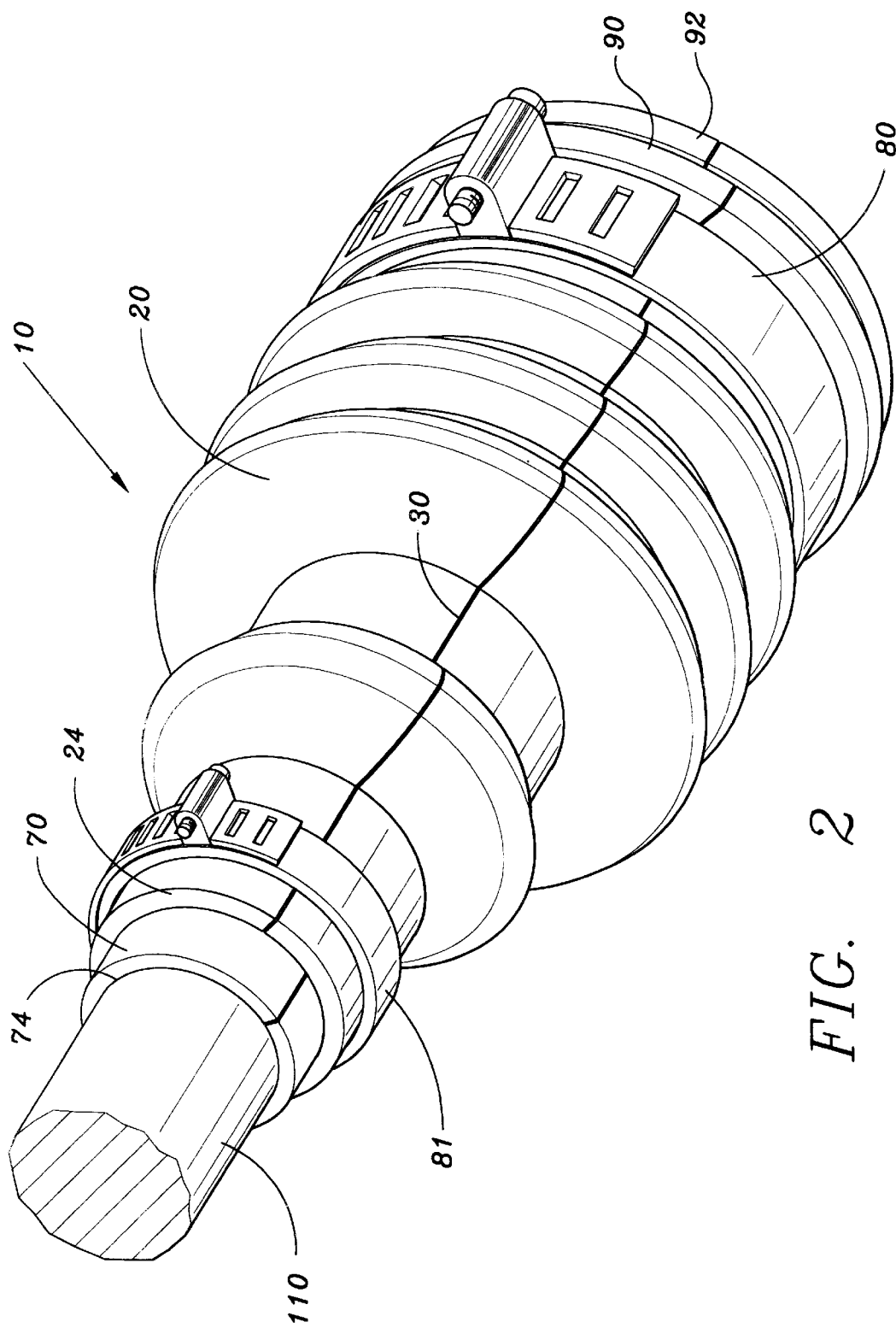
FIG. 2 is a perspective view of the CV joint boot and secondary sleeves installed around a CV joint housing and axle.

Referring to FIGS. 2 and 3, a small sealing sleeve 70 that has a main end opening 78 and subordinate end opening 74, is seated on the axle 110 of a flexible rotating joint and maintained in position underneath the clamped small end opening 24 of the tubular body 20 of the protective boot 10. A small flange 75 extends outward from the small sealing sleeve 70 proximate the main end opening 78. The flange 75 lends strength to the last crest 29 of the tubular body 20. The small flange 75 has a radial seam 33 running from the exterior 71 of the small sleeve 70 to the outer diameter of the small flange 79. A longitudinal seam 34 runs from the subordinate end opening 74 to the main end opening 78 meeting with the radial seam 33 of the small flange 75.

With reference again to FIG. 2, the installed protective boot for enclosing a flexible rotating joint 10 includes the small sealing sleeve 70 seated upon the axle 110 of a flexible rotating joint and the large sealing sleeve 60 seated on the housing 100 of a flexible rotating joint, and maintained in position underneath the large end opening 28 by a clamp 80 and the small end opening 24 by a clamp 81, respectively. Included are the use of an outwardly projecting flange 90 on the large end opening 28 of the tubular body 20 and an outwardly projecting flange 92 on the primary end opening 68 of the large sleeve 60. These flanges 90, 92 prevent the clamp 80 from slipping from atop the boot. Similar flanges (not shown) could be used at the small end opening 24 of the tubular body 20 and small sleeve 70 for maintaining the clamp 81 in place.

It is to be understood that the present invention is not limited to the embodiment described above, but encompasses any and all embodiments within the scope of the following claims.

I claim:

1. A protective seal in combination with a cover having a tubular body formed of a flexible material including a plurality of alternating crests and troughs for varying the length of the tubular body, the tubular body including a large end opening and small end opening for protecting a constant velocity joint and a means for securing the cover to the constant velocity joint, said positive seal comprising:

a first sleeve and a second sleeve;

said first sleeve having a primary end opening, an ancillary end opening, and a large flange extending radially from said first sleeve about said primary end opening, and having a seam extending from said ancillary end opening of said first sleeve to said large flange;

wherein said large flange being positioned internally of the tubular body, adjacent one of the crests;

first securing means for coupling said seam of said first sleeve and said flange;

said second sleeve including a main end opening, subordinate end opening, and a small flange extending radially from said second sleeve, about said main end opening, said second sleeve having a seam extending from said subordinate end opening of said second sleeve to said small flange; and second securing means for coupling said seam of said second sleeve and said small flange;

wherein said large flange being positioned internally of the tubular body, adjacent one of the crests via the first end opening of the tubular body, said small flange being positioned internally of the tubular body, adjacent another one of the crests via the second end opening of the tubular body; and the first and second securing means fixedly clamp the tubular body respectively to said first sleeve and said second sleeve about the constant velocity joint.

2. A protective seal for a universally rotating joint cover comprising:

a first sleeve having a primary end and an ancillary end, said primary end including a first flange, said first sleeve being longitudinally split from said first flange of said primary end to said ancillary end, and means for seaming said split of said first sleeve; and a second sleeve having a main end and an subordinate end, said main end including a second flange, said second sleeve being longitudinally split from said second flange of said main end to said subordinate end, and means for seaming said split of said second sleeve;

whereby said first flange internally engages a crest of an protective cover of a flexible rotating joint, and said second flange internally engages another crest of the protective cover of the flexible rotating joint.

\* \* \* \* \*